(12) United States Patent  (10) Patent No.: US 9,128,244 B2
Coup et al.  (45) Date of Patent: Sep. 8, 2015

(54) METHOD AND DEVICE FOR TRANSFORMING AN IMAGE

(75) Inventors: Thierry Jean-Andre Coup, Orlando, FL (US); Brian Birney McQuillian, Orlando, FL (US); James Donald Sanders, Mineralwells, TX (US); Eric Lynn Hunt, Orlando, FL (US); Eric Christopher Baker, Orlando, FL (US); George Peter Gakoumis, Jr., Orlando, FL (US); Richard Joseph Swim, Jr., Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 1101 days.

(21) Appl. No.: 13/100,532

(22) Filed: May 4, 2011

(65) Prior Publication Data

US 2011/0273485 A1 Nov. 10, 2011

Related U.S. Application Data

(60) Provisional application No. 61/330,939, filed on May 4, 2010.

(51) Int. Cl.
*G09G 5/10* (2006.01)
*G09G 5/00* (2006.01)
*G06F 3/038* (2013.01)
(Continued)

(52) U.S. Cl.
CPC ............... *G02B 5/223* (2013.01); *G02B 5/205* (2013.01); *G09G 3/001* (2013.01); *G09G 3/20* (2013.01); *G09G 2320/066* (2013.01); *G09G 2320/0666* (2013.01)

(58) Field of Classification Search
CPC ..... C03C 2205/02; B05D 5/06; H01J 29/898; G09G 3/3466
USPC ................... 345/204; 359/888; 428/410, 155; 348/362
See application file for complete search history.

(56) References Cited

U.S. PATENT DOCUMENTS 2,866,720 A * 12/1958 Martin et al. .................. 428/155
4,287,260 A * 9/1981 Prall .............................. 428/410

(Continued)

FOREIGN PATENT DOCUMENTS

CN 101055328 9/2012
GB 2397188 7/2004

OTHER PUBLICATIONS

Lorrie Freedman; "How to Give a Photograph a Painterly Look Using Photoshop", pp. 1-14; http://blog.lorrifreedman.com/index.php/2008/12/01/how-to-give-a-photograph-a-painterly-look-using-photoshop/.

(Continued)

*Primary Examiner* — Quan-Zhen Wang
*Assistant Examiner* — Lin Li
(74) *Attorney, Agent, or Firm* — Fletcher Yoder, P.C.

(57) ABSTRACT

A system and method for visually transforming an electronic image is provided. The electronic image may be displayed on a high-definition flat display screen and manipulated to appear as a work of art via a layered material. Embodiments include processing the electronic image to provide an electronically pre-filtered image, displaying the pre-filtered image on a display screen, and physically filtering the displayed, pre-filtered image with the layered material to reduce light emission, add texturing, and enhance the passage of a wavelength of light.

22 Claims, 3 Drawing Sheets

(51) Int. Cl.

| | |
|---|---|
| *F21V 9/04* | (2006.01) |
| *F21V 9/06* | (2006.01) |
| *G02B 5/08* | (2006.01) |
| *G02B 5/20* | (2006.01) |
| *G03B 7/00* | (2014.01) |
| *H04N 5/235* | (2006.01) |
| *G03B 17/24* | (2006.01) |
| *E06B 3/00* | (2006.01) |
| *G02B 5/22* | (2006.01) |
| *G09G 3/00* | (2006.01) |
| *G09G 3/20* | (2006.01) |

(56) References Cited

U.S. PATENT DOCUMENTS

| | | | | |
|---|---|---|---|---|
| 4,989,953 | A | * | 2/1991 | Kirschner ............ 359/888 |
| 6,167,206 | A | * | 12/2000 | Hylen ............ 396/316 |
| 6,388,709 | B1 | * | 5/2002 | Kobayashi et al. ............ 348/362 |
| 2005/0100690 | A1 | * | 5/2005 | Mayer et al. ............ 428/34 |
| 2005/0134959 | A1 | * | 6/2005 | Simpson et al. ............ 359/359 |
| 2007/0024603 | A1 | * | 2/2007 | Li ............ 345/204 |
| 2007/0194679 | A1 | | 8/2007 | Jo et al. |
| 2009/0154762 | A1 | | 6/2009 | Choi et al. |

OTHER PUBLICATIONS

Media Chance; "Dynamic Auto-Painter", pp. 1-8; http://www.mediachance.com/dap/index.html.

International Search Report for applicatin No. PCT/US2011/024577 mailed Aug. 19, 2011.

Office Action for Chinese Application No. 201180022286.8 issued Jul. 17, 2014.

\* cited by examiner

METHOD AND DEVICE FOR TRANSFORMING AN IMAGE

CROSS REFERENCE TO RELATED APPLICATIONS

This application claims the benefit of U.S. Provisional Application No. 61/330,939, filed May 4, 2010, which is incorporated herein by reference in its entirety.

BACKGROUND

The present invention relates to a method and apparatus for displaying electronic images on a display screen. More particularly, the present invention relates to a method and apparatus for making an electronic image on a display screen appear as a static or moving work of art (e.g., an oil painting).

Even as digital media and photography become more and more advanced, there remains a strong desire for paintings, particularly watercolors, oils, impastos and the like. Paintings are capable of conveying a feeling to the onlooker that photographs typically cannot. However, photographs are also desirable due to the inherent accuracy and artistic content therein. As a result, attempts have been made to make images, such as photographs, appear as paintings. For example, Photoshop® by Adobe Systems, Inc. allows a user to upload a photograph and add geometric lines (e.g., lines that suggest brush strokes) to make the photograph appear more like a painting.

However, these existing methods, like Photoshop®, depend on pixel-based image processing, and have a limited ability to transform a two-dimensional (2D) image into a natural image such as that a person directly paints. Specifically, it is now recognized that traditional methods are limited with respect to providing effects such as those associated with oil painting, pen illustration, cartoon, template mosaic, and the like to the 2D image.

Other products have been developed which allow a user to add painting-like characteristics to a photograph by adding suggested features, or having the software add those features for the user. For example, Dynamic Auto-Painter by Media Chance Inc. allows a user to upload a photograph, choose a style of an artist (e.g., Monet, Benson), and the software generates the scene in the photograph to mirror the chosen artists style.

U.S. Patent Application No. 20090154762A1 describes an image transforming method of providing an image transformation service by applying a plurality of non-photorealistic transforming effects to an input image of a user, including receiving a request for an image transformation through a wired/wireless network from the user, performing the image transformation at a user's terminal or a server according to a user's circumstance, and creating a resulting image applied with the non-photorealistic image transforming effects. The application further describes that face recognition is applied to assign additional strokes to a face portion of a character in the input image containing the character such that depiction of the character is enhanced. In a step of creating a moving picture, a procedure of creating the result image by applying a template mosaic and oil painting is stored in the form of a moving picture.

The systems mentioned above require a reasonably high degree of user intervention to turn their chosen photograph into a painting-like image, and only focus on electronic filtering to produce the desired effect.

In conjunction with advancements in methods and applications for providing digital media (e.g., videos and/or pictures), major advances in hardware for high-definition viewing of this media have been achieved. Indeed, high-definition flat panel displays such as high-definition liquid crystal display (LCD) televisions have enabled users to compose and view high-definition media as slideshows and the like. Typically, videos and/or pictures are sent to a display from a high-definition image server, rendered, and displayed for a viewer.

BRIEF DESCRIPTION

In accordance with one embodiment of the present invention, a method for visually transforming an electronic image displayed on a high-definition flat display screen to appear as a work of art is provided. The method includes providing a high-definition electronic image, processing the electronic image including reducing contrast to provide a electronically pre-filtered image, displaying the pre-filtered image on the high-definition flat display screen, and physically filtering the displayed, pre-filtered image to reduce light emission and enhance the passage of a wavelength of light.

In accordance with another embodiment of the present invention, a layered material for rendering an electronic image such that the electronic image appears as a work of art is provided. The layered material being attachable to a high-definition flat display screen, and the layered material including a neutral density filter configured to reduce light emission of the image to a viewing eye, an amber filter mounted to the neutral density filter, and a transparent substrate mounted to the amber filter and having an acrylic glaze thereon.

In accordance with another embodiment of the present invention, a filter combination is provided. The filter combination includes a neutral density filter, an amber filter, and a transparent substrate having an acrylic glaze thereon. Further, the filter combination is attachable to a high-definition flat display screen and configured to visually transform an electronic image on the high-definition display screen to appear as a painting.

Other features and advantages of the disclosure will become apparent by reference to the following description taken in connection with the accompanying drawings.

DRAWINGS

Reference is now made briefly to the accompanying drawings, in which.

Like reference characters designate identical or corresponding components and units throughout the several views, which are not to scale unless otherwise indicated.

DETAILED DESCRIPTION

One embodiment of the present invention involves a method for visually transforming an electronic image generated on a display (e.g., displayed on a high-definition flat display screen) to appear as a work of art. Another embodiment of the present invention relates to a device for visually transforming an electronic image to appear as a work of art. An exemplary advantage afforded by this invention is to provide a new experience for a guest (e.g., a guest at a theme park). Another exemplary advantage afforded by this invention is the ability to automatically shuffle media in a frame (e.g., provide a slide show of digital photographs) and transform them to appear as works of art (e.g., oil painting, stucco, etc.).

Specific configurations and arrangements of the claimed invention, discussed below with reference to the accompanying drawings, are for illustrative purposes only. Other configurations and arrangements that are within the purview of a skilled artisan can be made, used, or sold without departing from the spirit and scope of the appended claims. For example, while some embodiments of the invention are herein described with reference to theme parks and line queues, a skilled artisan will recognize that embodiments of the invention can be implemented in a private home, sold as a stand-alone product or used in theater.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

One embodiment of the present invention relates to a device for rendering an electronic image (e.g., an image displayed on a high-definition television) such that the electronic image appears as a work of art. The device may comprise a layered material which is attachable to a high definition flat display screen, which will be discussed with reference to FIGS. 1-3.

Figure 1:
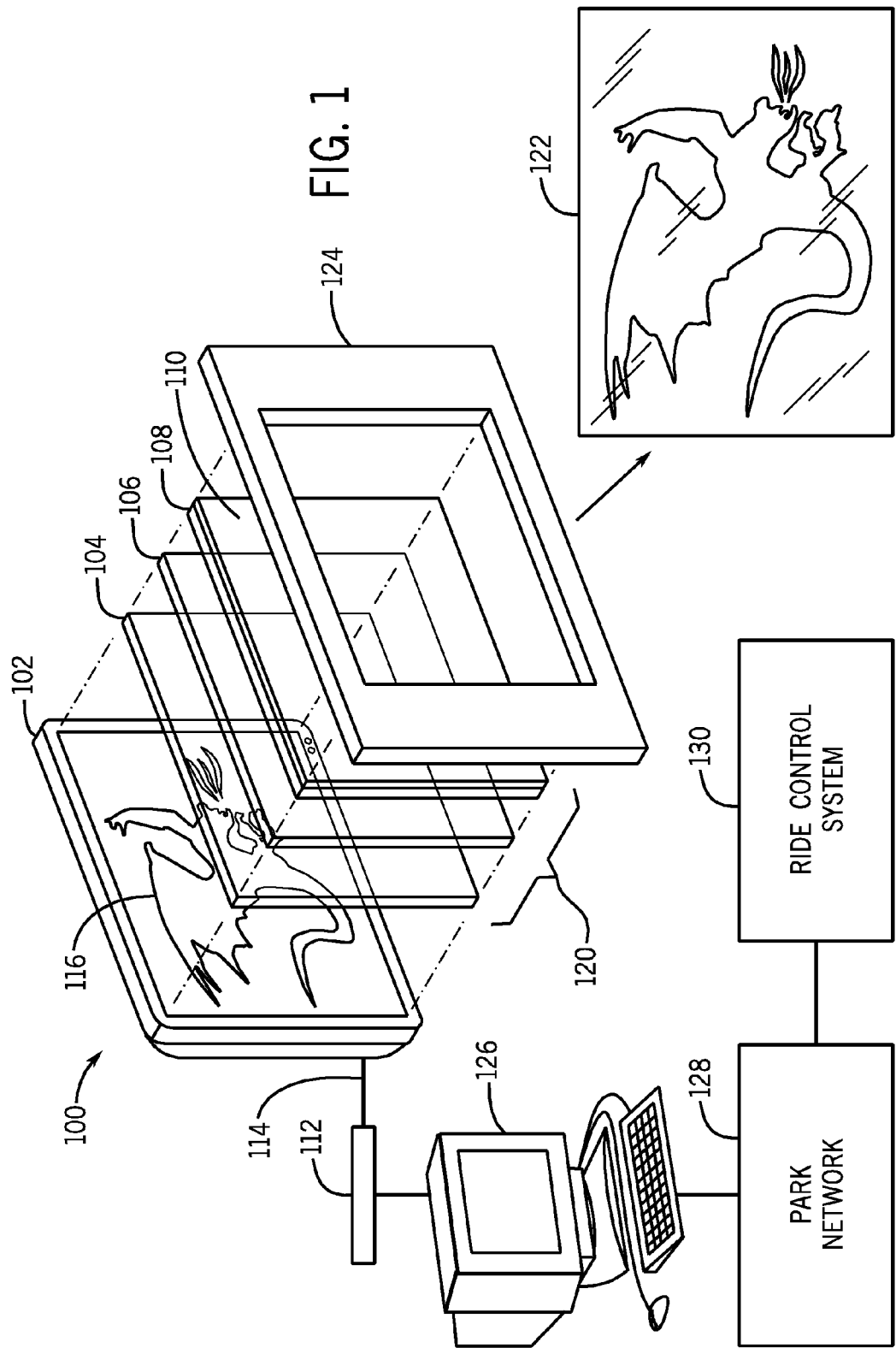
FIG. 1 is an exploded view of an exemplary layered material for rendering an electronic image in accordance with an embodiment of the present techniques.

Referring now to FIG. 1, a system 100 including a layered material 120 and a display device or screen 102 in communication with various network devices is illustrated in accordance with present techniques. Specifically, FIG. 1 includes an exploded view of the layered material 120 and the display device or screen 102, wherein the display device 102 and the layered material 120 are configured to render an electronic image 116 displayed on the display device 102 to appear as a work of art. The layered material 120 may comprise a first layer 104, a second layer 106, a third layer 108, and a fourth layer 110. The layers 104, 106, 108, and 110 may include a combination of filters or panels and coatings (e.g., glaze) that can be rearranged in different embodiments. In the illustrated embodiment, the first layer 104, the second layer 106, and the third layer 108 are filters or panels, and the fourth layer 110 includes one or more coatings.

While different types of displays or monitors may be utilized in accordance with present embodiments, in the illustrated embodiment, the display device or screen 102 includes a high-definition flat display screen television (also referred to herein as an "HDTV"). The HDTV 102 may include an LCD television having a video format support of 1080p/1080i, a native resolution of 1920×1080, a pixel number of 2,073,600, an aspect ratio of 16:9, a field rate of between 60-240 Hz, an image contrast ratio of 1200:1, and may further include backlighting. In an optional embodiment, a plasma television may be used rather than an LCD. Of course, a skilled artisan will recognize that other types of HDTVs may be used (e.g., DLP, LED, LCoS, etc). Also, a video format of 720p (native resolution 1280×720) may be used in relation to the present invention, if desired.

The HDTV 102 may be connected to a high-definition server 112 via line 114, which may be representative of a network line. The high-definition server 112 may be configured to send electronic images (e.g., the image 116), such as the exemplary fire-breathing dragon shown in the FIG. 1, to the HDTV. The high-definition server 112 may be a web-based digital photograph management system and/or video management system (e.g., media management system), which allows a user to choose a set of predetermined photographs or videos for display on the HDTV 102. The image server 112 may also be used for more advanced applications, such as the navigation of very large image sets, the management of various images sizes and regions from a single source, and for streaming media (e.g., video).

The high-definition server 112 is representative of a device that can be configured to process and filter images to reduce contrast, enhance predetermined colors, and add a brush stroke effect. Once an electronic image has been processed and filtered by a device such as the high-definition server 112, the electronic image may be referred to as an electronically filtered image. For example, in the illustrated embodiment of FIG. 1, the image 116 of the dragon may be an electronically filtered image provided by the high-definition server 112 for display on the HDTV 102. The image 116 may also undergo physical filtering, which will be discussed in greater detail with relation to layers 104, 106, 108, and 110. The electronic filtering and processing may comprise rendering the image with gamma, contrast, vibrance, saturation and brightness correction. In another embodiment, the electronic filters may be set such that the background is black.

In an exemplary embodiment, the HDTV 102 may be placed or hung proximate a line queue at a theme park, and may function to display images that correspond to a theme of that particular attraction. For example, in the Wizarding World of Harry Potter® at Universal Studios Orlando, a guest may be in a line queue, or walking through a castle, and the HDTV 102 may be placed along desired walls for guest viewing. Using the layers 104, 106, 108, 110 explained in relation to FIG. 1, an image displayed on the HDTV 102 may be made to appear like a work of art, such as an oil painting. This effect may be facilitated by the image server 112, which may cooperate with the physical filters 120 to alter the image 116 on the screen 102 so that a guest will have the impression that the image 116 is either a static oil painting, or is a changing oil painting via streaming media.

To this end, the high-definition image server 112 may be connected to a main processor 126, and thus may be in communication with the HDTV 102 and the main processor 126 via a hardwired LAN network (e.g. line 114) or wireless communication (e.g., Wi-Fi, Bluetooth™, etc.). The main processor 126 may comprise main hardware system components (e.g., hard disc storage and networking components) together with main software components for execution of a plurality of functions such as data storage and data retrieval. The main processor 126 may be in further communication with a park network 128, which may function to send images or streaming media to a plurality of park locations, e.g., various rides and/or attractions. The processor 126, via park network 128, may be in further communication with at least one ride control system 130. In operation, the processor 128 may be configured to alter the images or streaming media based on signals from the ride control system 130, so that the images or media will correspond with a guest's location on a ride to enhance the desired effect of the ride. For example, images of a particular guest may be presented on the HDTV 102 through the layered material 120 at a location proximate the particular guest's location in a queue. In one embodiment, the park network 128 may include a connection to the Internet for communication over the World Wide Web.

As indicated above, the layered material 120 includes a combination of physical filters or panels (e.g., layers 104, 106, 108), and a coating (e.g., layer 110). Further, the layered material 120 may be fixed proximate to the HDTV 102 through the use of a standard frame 124, which may be selected based on user preference. The frame 124 may be dimensioned such that each of the layered materials 120 (e.g., filters or panels 104, 106, 108) may be sandwiched together in a fused configuration and supported by the frame 124. The frame 124 may be configured for direct attachment to a wall substrate, in an exemplary embodiment, independent of the HDTV 102. In one embodiment, the frame 124 may be attached directly to the HDTV 102.

The first layer 104 may include a neutral density filter. For example, the neutral density filter may be either a colorless filter or a gray filter. The first layer 104 may be configured to reduce and/or modify the intensity or emission of all wavelengths or colors of light from the HDTV 102 equally, while keeping constant a hue of color rendition. The neutral density filter, in an exemplary embodiment, may comprise GamColor® neutral density filter No. 1518 1.2 ND produced by Gam Products, Inc.

The second layer 106 may include an amber filter. In an exemplary embodiment, the amber filter may include a GamColor® No. 385, Light Amber, produced by Gam Products, Inc. The second layer 106 is configured to further reduce the light output from the HDTV 102 and to change the hue of the light output to a slight yellow/amber color. In operation, the second layer 106 (amber filter) may give the image a "dated" appearance associated with yellowing (i.e., the image may look older and thus more like a work of art than a high definition digital image).

The third layer 108 may include a polycarbonate resin thermoplastic (e.g., LEXAN®, a register trademark of SABIC Innovative Plastics' Corporation). The polycarbonate resin thermoplastic may be a clear resin. Further, in an exemplary embodiment, the polycarbonate resin thermoplastic may be at least approximately ⅛ inch thick. The polycarbonate resin thermoplastic layer may be treated with an acrylic glaze, which forms the fourth layer 110 or a portion of the fourth layer 110. The acrylic glaze of the fourth layer 110 may include a pigment suspended in an acrylic polymer emulsion. The acrylic glaze may be applied in first and second layers. The first layer may include a crystal glaze, and the second layer may include a crackle treatment. In an exemplary embodiment, the crackle treatment may include adi-crackle glaze, produced by Adicolor, Inc. These layers may be applied with a brush (e.g., a paint brush). Together, these layers operate to give the image 116 a "brushed-on/aged" look while also allowing ambient light to reflect off textures (e.g., ridges) provided by the fourth layer 110 over the image 116, as a true oil painting would. For example, image 122 represents the result of filtering the image 116 of the fire-breathing dragon to resemble a true oil painting in accordance with present techniques.

Figure 3:
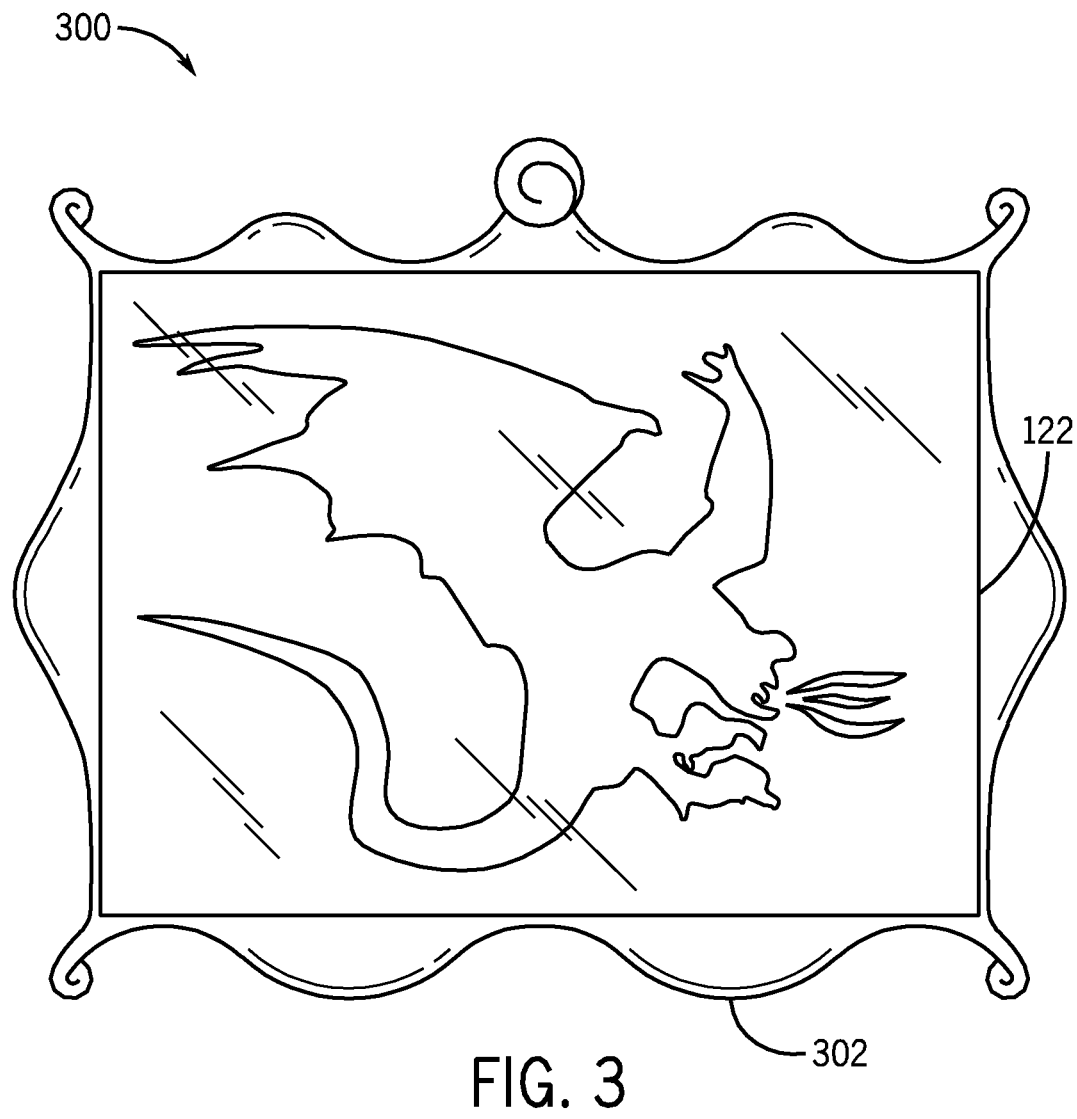
FIG. 3 is a front view of a device displaying a transformed electronic image in accordance with an embodiment of the present techniques.

The layers 104, 106, and 108 may be fused to form the layered material 120. In this regard, the layered material 120 may be fused together at borders of the layers 104, 106, and 108 via a heat treatment. The layers 104, 106, and 108 may be attached at the frame 124 to hide the normal display edge of the HDTV 102. Indeed, as illustrated in FIG. 3, a frame 302 is positioned over the HDTV 102 and the layered material 120 such that the frame 302 covers the normal display edges of the HDTV 102.

Figure 2:
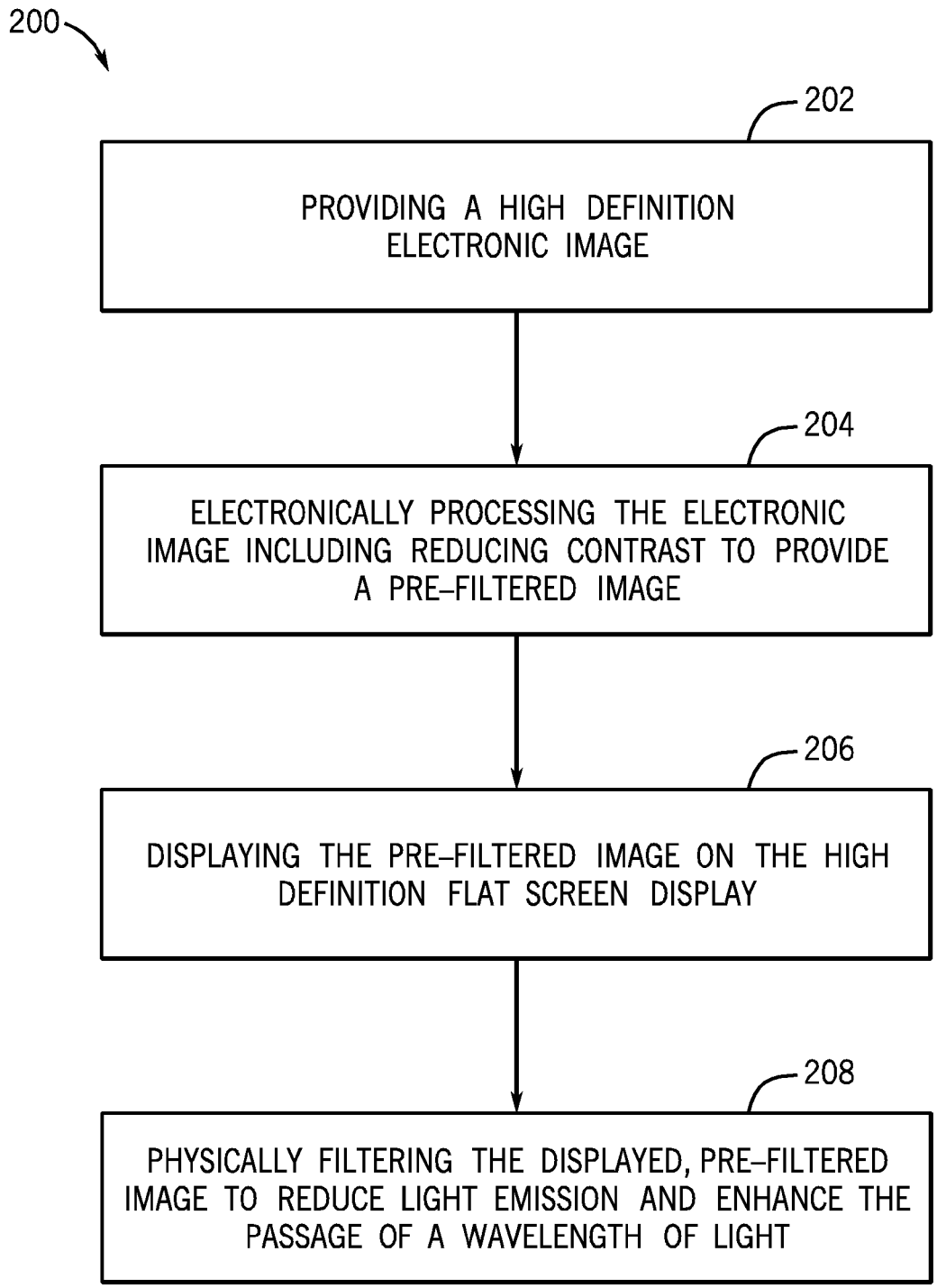
FIG. 2 is a flow chart describing a stepwise method for visually transforming an electronic image displayed on a screen to appear as a work of art in accordance with an embodiment of the present techniques.

Referring now to FIG. 2, a flow-chart to better help illustrate a method for visually transforming an electronic image displayed on a high-definition flat display screen to appear as a work of art is shown generally at reference numeral 200. While the flowchart shows an exemplary step-by-step method, it is to be appreciated that a skilled artisan may rearrange or reorder the steps while maintaining like results.

Providing a high definition electronic image, step 202, may include providing a HDTV and/or displaying an image on a display, such as described with reference to FIG. 1. The high definition flat display screen television may be connected to a high definition server which may be configured to send electronic images.

Step 204 includes electronically processing the electronic image. In one embodiment, this includes reducing contrast to provide a pre-filtered image. Further, step 204 may include configuring the high definition server to electronically process and filter images to reduce contrast, enhance predetermined colors, and add a brush stroke effect using image modification techniques known in the art (e.g., Photoshop®).

Step 206 includes displaying the pre-filtered image on the high definition flat screen television. This may include inputting commands at a computer, and through the computer's main processor, sending commands to the high definition server. The high definition image server may then render the images or media for display on the high definition flat screen display. Based on commands from a user, the processor may be configured to change the images or streaming media. Optionally, the images may change based on signals from a ride control system, which may also be in communication with processor (e.g., via park network or the Internet). The image may be a digital image or, in optional embodiments, streaming media.

Step 208 includes physically filtering the displayed, pre-filtered image to reduce light emission and enhance the passage of a wavelength of light. This may include providing the layered material discussed with reference to FIG. 1, and positioning the layered material such that the image is filtered through the layered material. For example, a combination of physical filters or panels and a coating may be provided and configured to be attachable to a display (e.g., an HDTV). To reduce light emission, a neutral density filter may be provided, which may be further configured to modify the intensity or emission of all wavelengths or colors of light equally, while keeping constant the hue of color rendition. A second layer including an amber filter may be mounted to the first layer and configured to allow yellow or amber light to pass through to give the image a "dated" appearance. A third layer including a polycarbonate resin thermoplastic treated with an acrylic glaze, the acrylic glaze forming a fourth layer, may include a pigment suspended in an acrylic polymer emulsion and may be configured to give the image a "brushed-on" look while also allowing ambient light to reflect off the fourth layer, as the light would generally reflect off of a true oil painting.

Referring now to FIG. 3, a system 300 including the final image 122 positioned within the picture frame 302 is shown. In an exemplary embodiment, the frame 302 may contribute to the dated look of the image. For example, the frame 302 may be made of wood and designed to appear as a frame from antiquity. The frame 302 may comprise front lighting with a low intensity light from either the bottom or the top of the frame to, again, give the image a more dated look. The frame 302 may further comprise a rubberized weatherstripping (not shown) affixed to an inner portion of the frame at the edges of the frame to isolate light transmission. In operation, the image 122, from the perspective of an onlooker or viewing guest, appears to be a work of art, such as an oil painting, but is actually a filtered electronic image or streaming media generated by the high definition server and displayed on a display device (e.g., HDTV 102).

Although specific features of various embodiments of the invention may be shown in some drawings and not in others, this is for convenience only. In accordance with the principles of the invention, the feature(s) of one drawing may be combined with any or all of the features in any of the other drawings. The words "including", "comprising", "having", and "with" as used herein are to be interpreted broadly and comprehensively and are not limited to any physical interconnection. Moreover, any embodiments disclosed herein are not to be interpreted as the only possible embodiments. Rather, modifications and other embodiments are intended to be included within the scope of the appended claims.

The invention claimed is:

1. A display filtering system, comprising:
   a first layer including a neutral density filter sized to at least fit over an image from a display and configured to reduce and/or modify wavelengths of light from the image while maintaining a hue of color rendition of the image;
   a second layer including a color filter sized to fit at least over the image from the display, wherein the color filter is configured to reduce a light output of the image and to change a hue of the light output to include a yellow and/or amber color; and
   a third layer sized to fit at least over the image from the display, the third layer including a coating with texturing resembling a painting surface.

2. The display filtering system of claim 1, wherein the third layer comprises a polycarbonate resin thermoplastic panel treated with an acrylic glaze.

3. The display filtering system of claim 1, wherein the coating comprises a crystal glaze layer and a crackle treatment layer.

4. The display filtering system of claim 1, wherein the neutral density filter comprises a colorless filter or a gray filter.

5. The display filtering system of claim 1, wherein the first layer, second layer, and third layer are fused together along edges of each layer.

6. The display filtering system of claim 1, comprising the display coupled with the first layer, second layer, and third layer.

7. The display filtering system of claim 6, wherein the display comprises a high-definition flat display screen.

8. The display filtering system of claim 6, wherein the second layer is coupled directly to the display, the first layer is coupled to the second layer, and the third layer is coupled to the first layer.

9. The display filtering system of claim 1, wherein the texturing provides a brushed-on appearance.

10. The display filtering system of claim 1, comprising a processor configured to process and/or pre-filter the image.

11. A method for visually transforming an electronic image, comprising:
    passing the electronic image through a first layer including a neutral density filter, wherein passing the electronic image through the first layer reduces and/or modifies wavelengths of light from the electronic image while maintaining a hue of color rendition of the electronic image;
    passing the electronic image through a second layer including a color filter, wherein passing the electronic image through the second layer reduces a light output of the electronic image and changes a hue of the light output to include a yellow and/or amber color; and
    passing the electronic image through a third layer including a coating with texturing resembling a painting surface.

12. The method of claim 11, wherein passing the electronic image through the second layer comprises filtering the electronic image through an amber filter.

13. The method of claim 11, comprising displaying the electronic image on a high-definition flat screen television.

14. The method of claim 11, comprising electronically processing the image with a processor.

15. The method of claim 14, wherein electronically processing the electronic image comprises reducing contrast in the electronic image, enhancing colors of the electronic image, diffusing the electronic image, or adding a brush-stroke effect in the electronic image.

16. The method of claim 11, comprising displaying a video stream, wherein the electronic image is one of numerous images in the video stream.

17. The method of claim 11, wherein passing the electronic image through the first layer comprises passing the electronic image through a colorless or gray filter.

18. A method of manufacturing a display filtering system, comprising:
    coupling a first layer to a video display such that an image provided on the video display is filtered by the first layer, wherein the first layer includes a neutral density filter configured to reduce and/or modify wavelengths of light from the image while maintaining a hue of color rendition of the image;
    coupling a second layer to the video display such that the image provided on the video display is filtered by the second layer, the second layer including a color filter configured to reduce a light output of the image and to change a hue of the light output to include a yellow and/or amber color; and
    coupling a third layer to the video display such that the image provided on the video display is passed through the third layer, the third layer including a coating with texturing resembling a painting surface.

19. The method of claim 18, comprising coupling the third layer to the video display with the first layer and the second layer in between the third layer and the video display.

20. The method of claim 18, wherein coupling the second layer to the video display comprises coupling an amber filter to a high-definition television, and wherein coupling the first layer to the video display comprises coupling a colorless or gray filter to the video display via a coupling between the first layer and the second layer.

21. The method of claim 18, wherein coupling the third layer to the video display comprises applying a coating of brushed-on clear acrylic glaze.

22. The display filtering system of claim 6, wherein the third layer is an outmost layer away from the display, and the first layer and the second layer are in between the third layer and the display.

* * * * *